United States Patent
Jeon

(10) Patent No.: US 11,623,553 B2
(45) Date of Patent: Apr. 11, 2023

(54) INTELLIGENT MASSAGE CHAIR AND THE CONTROL METHOD OF THE SAME

(71) Applicant: LG Electronics Inc., Seoul (KR)

(72) Inventor: Jinhwa Jeon, Seoul (KR)

(73) Assignee: LG Electronics Inc., Seoul (KR)

(*) Notice: Subject to any disclaimer, the term of this patent is extended or adjusted under 35 U.S.C. 154(b) by 578 days.

(21) Appl. No.: 16/692,675

(22) Filed: Nov. 22, 2019

(65) Prior Publication Data
US 2020/0086778 A1 Mar. 19, 2020

(51) Int. Cl.
*B60N 2/90* (2018.01)
*G06N 3/08* (2006.01)
(Continued)

(52) U.S. Cl.
CPC .............. *B60N 2/976* (2018.02); *A61H 7/00* (2013.01); *G06N 3/08* (2013.01); *G06V 20/59* (2022.01);
(Continued)

(58) Field of Classification Search
CPC ........ G06N 3/08; G06N 3/0454; G06N 3/084; G06N 3/0445; G06N 3/0472; H04W 4/40; H04W 56/001; H04W 72/042; H04W 74/0833; G06V 20/59; G06V 40/10; B60N 2/976; A61H 7/00; A61H 2201/0149; A61H 2201/501; A61H 2201/5071; A61H 2201/5092; A61H 2230/625; A61H 2230/805; A61H 2201/1633; A61H 2201/5035; A61H 2201/5043; A61H 2201/5058; A61H 2205/02; A61H 2205/06; A61H 2205/062; A61H 7/007;
(Continued)

(56) References Cited

U.S. PATENT DOCUMENTS 6,117,094 A * 9/2000 Fujii ................... A61H 39/04
601/102
2015/0313475 A1* 11/2015 Benson ............... A61B 5/0205
600/323
(Continued)

FOREIGN PATENT DOCUMENTS

CN 113525189 * 3/2021
EP 3251889 A1 * 12/2017
(Continued)

*Primary Examiner* — Nizar N Sivji
(74) *Attorney, Agent, or Firm* — Fish & Richardson P.C.

(57) ABSTRACT

Disclosed herein are an intelligent massage chair and a control method thereof. The intelligent chair includes a sensing unit mounted on the intelligent chair, and including at least one sensor, and a controller. The controller performs a control to determine a user's body condition based on the information about the user's body acquired through the sensing unit, and to determine an operation mode based on the determined user's body condition, and to add the information about the user's body, when it is determined that the determined operation mode is not an optimum operation mode for the user. One or more of an intelligent massage chair, an autonomous vehicle, a user terminal and a server of the present disclosure can be associated with artificial intelligence modules, drones (unmanned aerial vehicles (UAVs)), robots, augmented reality (AR) devices, virtual reality (VR) devices, devices related to 5G service, etc.

17 Claims, 12 Drawing Sheets

(51) Int. Cl.
    *H04W 72/04*     (2009.01)
    *H04W 4/40*     (2018.01)
    *H04L 5/00*     (2006.01)
    *H04W 56/00*     (2009.01)
    *H04W 74/08*     (2009.01)
    *A61H 7/00*     (2006.01)
    *G06V 20/59*     (2022.01)
    *G06V 40/10*     (2022.01)
    *B64C 39/02*     (2006.01)
    *B64D 11/06*     (2006.01)

(52) U.S. Cl.
    CPC ............ G06V 40/10 (2022.01); H04L 5/0048 (2013.01); H04W 4/40 (2018.02); H04W 56/001 (2013.01); H04W 72/042 (2013.01); H04W 74/0833 (2013.01); *A61H 2201/0149* (2013.01); *A61H 2201/501* (2013.01); *A61H 2201/5071* (2013.01); *A61H 2201/5092* (2013.01); *A61H 2230/625* (2013.01); *A61H 2230/805* (2013.01); *B64C 39/026* (2013.01); *B64D 11/06* (2013.01)

(58) Field of Classification Search
    CPC ............ A61H 9/005; A61H 2201/1215; A61H 2203/0431; A61H 2205/10; A61H 2205/04; A61H 2205/081; A61H 2205/088; A61H 2205/12; H04L 5/0048; H04L 67/125; H04L 67/306; H04L 5/0023; H04L 5/0044; H04L 5/0051; H04L 5/0053; H04L 5/005; H04L 67/12; B64C 39/026; B64D 11/06
    See application file for complete search history.

(56) References Cited

U.S. PATENT DOCUMENTS

| | | | |
|---|---|---|---|
| 2018/0015853 A1* | 1/2018 | Lem | B60N 2/976 |
| 2018/0134116 A1* | 5/2018 | Chen | B60N 2/976 |
| 2019/0038229 A1* | 2/2019 | Perraut | A61H 9/0078 |
| 2019/0299830 A1* | 10/2019 | Alequin | B60N 2/56 |
| 2019/0388296 A1* | 12/2019 | Lee | H04W 4/025 |
| 2020/0086778 A1* | 3/2020 | Jeon | H04W 4/40 |
| 2020/0241683 A1* | 7/2020 | Le | A61H 15/0078 |
| 2021/0155136 A1* | 5/2021 | Kim | H04W 4/48 |

FOREIGN PATENT DOCUMENTS

| | | | | |
|---|---|---|---|---|
| JP | 2013538755 | * | 10/2013 | |
| WO | WO-2020015617 A1 | * | 1/2020 | |
| WO | WO-2020251073 A1 | * | 12/2020 | A61H 15/0078 |

* cited by examiner

INTELLIGENT MASSAGE CHAIR AND THE CONTROL METHOD OF THE SAME

CROSS-REFERENCE TO RELATED APPLICATION

This application claims the priority benefit of Korean Patent Application No. 10-2019-0408436, filed on Sep. 2, 2019, which is incorporated herein by reference for all purposes as if fully set forth herein.

BACKGROUND OF THE INVENTION

Field of the Invention

The present disclosure relates to an intelligent massage chair and a control method thereof and, more particularly, to an intelligent massage chair and a control method thereof, which are intended to store information about a user's body characteristics using sensors mounted on the massage chair, and to grasp information about a user's body type by associating collected data with deep learning technology, thus being capable of recommending a massage course and massage strength.

Related Art

A massage chair is a chair that is designed to mechanically offer massage effect at home or at the workplace without the assistance of a masseur. The massage chair is provided with various driving devices such as an airbag or a massage ball. Thus, a user sits on the massage chair and then operates the chair, so that he or she obtains massage effect including acupressure or fomentation. When a user desires to get a massage in the massage chair, he or she operates the massage chair by applying an operating signal via a manipulation unit while sitting on the massage chair. The massage chair receiving the operating signal starts a massage operation after moving a backrest part and a leg fixing part at predetermined angles to preset initial positions so that the user is in a comfortable state.

A premium massage chair usually includes a sensor that may sense the height of the shoulders, and a sensor that may sense the length of the legs. Thus, after sensing the user's shoulder height and leg length, respectively, the backrest part and the leg fixing part are moved to be suitable for his or her shoulder height and leg length and thereby the initial position is set to be fit for the user. In this state, the massage operation is started.

However, a low-cost massage chair does not have a sensor that may sense the leg length and a driving unit that may move the leg fixing part at an initial stage. Thus, even if any user operates the massage chair, the leg fixing part is fixed to only the initial position that has been set during the manufacture of the chair.

In this case, if a tall user fixes his or her foot to a foot fixing part, the leg is not fixed in the leg fixing part but a knee region is separated from the chair. Consequently, the massage operation is started while the user is in a very uncomfortable state, or the leg fixing part should be pressed with the user's force.

In contrast, as for a short user, his or her foot may not reach the foot fixing part. Likewise, the massage operation is started while the user is in a very uncomfortable state.

SUMMARY OF THE INVENTION

An object of the present disclosure is to solve the problems described above.

The present disclosure provides an intelligent massage chair and a control method thereof, which are intended to store information about a user's body characteristics using sensors mounted on the intelligent chair, and to grasp information about a user's body type by associating collected data with deep learning technology, thus being capable of recommending a massage course and massage strength.

Furthermore, the present disclosure provides an intelligent massage chair and a control method thereof, which determine a driver's body condition through AI processing, thus improving the reliability of a product.

In an aspect, a control method of an intelligent massage chair may include acquiring information about a user's body; determining a user's body condition based on the information about the user's body; determining a massage operation mode based on the determined user's body condition, when the user's body condition is determined; adding the information about the user's body, when it is determined that the determined massage operation mode is not an optimum massage operation mode for the user; determining a readjusted massage operation mode based on the added information about the user's body; and controlling the chair to the readjusted massage operation mode.

The determining of the user's body condition may include extracting characteristic values from sensing information acquired through at least one sensor; and inputting the characteristic values into a trained artificial neural network (ANN) classifier to distinguish whether the mode is the optimum massage operation mode for the user, and determining the optimum massage operation mode from output of the artificial neural network, wherein the characteristic values may be values that can distinguish whether the mode is the optimum massage operation mode for the user.

The control method may further include receiving, from at least one network, Downlink Control Information (DCI) used to schedule transmission of the information about the user's body acquired from at least one sensor provided in the intelligent chair, wherein the information about the user's body may be transmitted to the network based on the DCI.

The control method may further include performing an initial access procedure with the network based on a synchronization signal block (SSB), wherein the information about the user's body may be transmitted through a PUSCH to the network, and the SSB and a DM-RS of the PUSCH may be quasi-co located for a QCL type D.

The control method may further include controlling a communication unit to transmit the information about the user's body to an AI processor included in the network; and controlling the communication unit to receive AI processed information from the AI processor, wherein the AI processed information may be information that determines whether the mode is the optimum massage operation mode for the user or is not the optimum massage operation mode for the user.

The control method may further include transmitting a V2X message including the information about the user's body condition to another terminal that is communication linked to a vehicle.

In another aspect, an intelligent massage chair may include a sensing unit mounted on the intelligent chair, and including at least one sensor; and a controller receiving a plurality of sensing information sensed through the sensing unit to control the intelligent chair, wherein the controller may perform a control to determine a user's body condition based on the information about the user's body acquired through the sensing unit, and to determine an operation mode based on the determined user's body condition, and to add the information about the user's body, when it is determined that the determined operation mode is not an optimum operation mode for the user, and to readjust the operation mode based on the added information about the user's body.

The controller may extract characteristic values from sensing information acquired through at least one sensor, and may input the characteristic values into a trained artificial neural network (ANN) classifier to distinguish whether the mode is the optimum massage operation mode for the user, and may determine the optimum massage operation mode from output of the artificial neural network.

The characteristic values may be values that can distinguish whether the mode is the optimum massage operation mode for the user.

The intelligent massage chair may further include a communication unit, wherein the controller may control the communication unit to transmit the information about the user's body condition to an AI processor included in the network, and may control the communication unit to receive AI processed information from the AI processor, wherein the AI processed information may be information that determines whether the mode is the optimum massage operation mode for the user or not.

The intelligent massage chair may be mounted to a driver's seat for a vehicle's driver or a passenger seat next to the driver's seat.

Effects of an intelligent massage chair according to the present disclosure are described hereafter.

The present disclosure can intend to store information about a user's body characteristics using sensors mounted on the intelligent chair, and to grasp information about a user's body type by associating collected data with deep learning technology, thus being capable of recommending a massage course and massage strength.

Furthermore, the present disclosure can determine a driver's body condition through AI processing, thus improving the reliability of a product.

The accompanying drawings, which are included to provide a further understanding of the disclosure and are incorporated in and constitute a part of this specification, illustrate embodiments of the disclosure and together with the description serve to explain the technical features of the disclosure.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Block Diagram of UE and 5G Network

Figure 1:
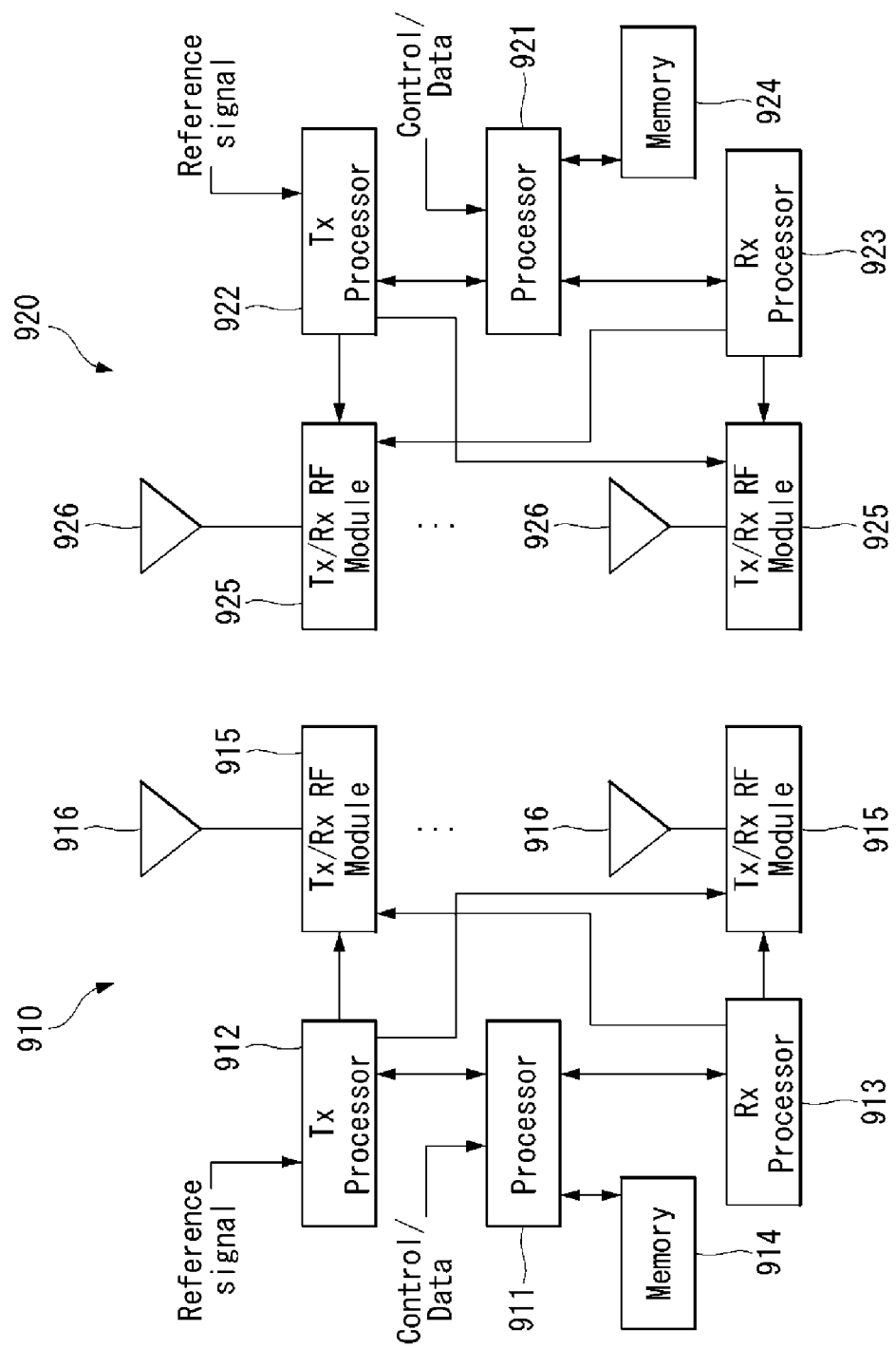
FIG. 1 illustrates a block diagram of a wireless communication system to which methods proposed in the present disclosure are applicable.

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 can perform detailed autonomous operations.

A 5G network including another vehicle communicating with the autonomous device is defined as a second communication device (920 of FIG. 1), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, a terminal or user equipment (UE) may include a vehicle, a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
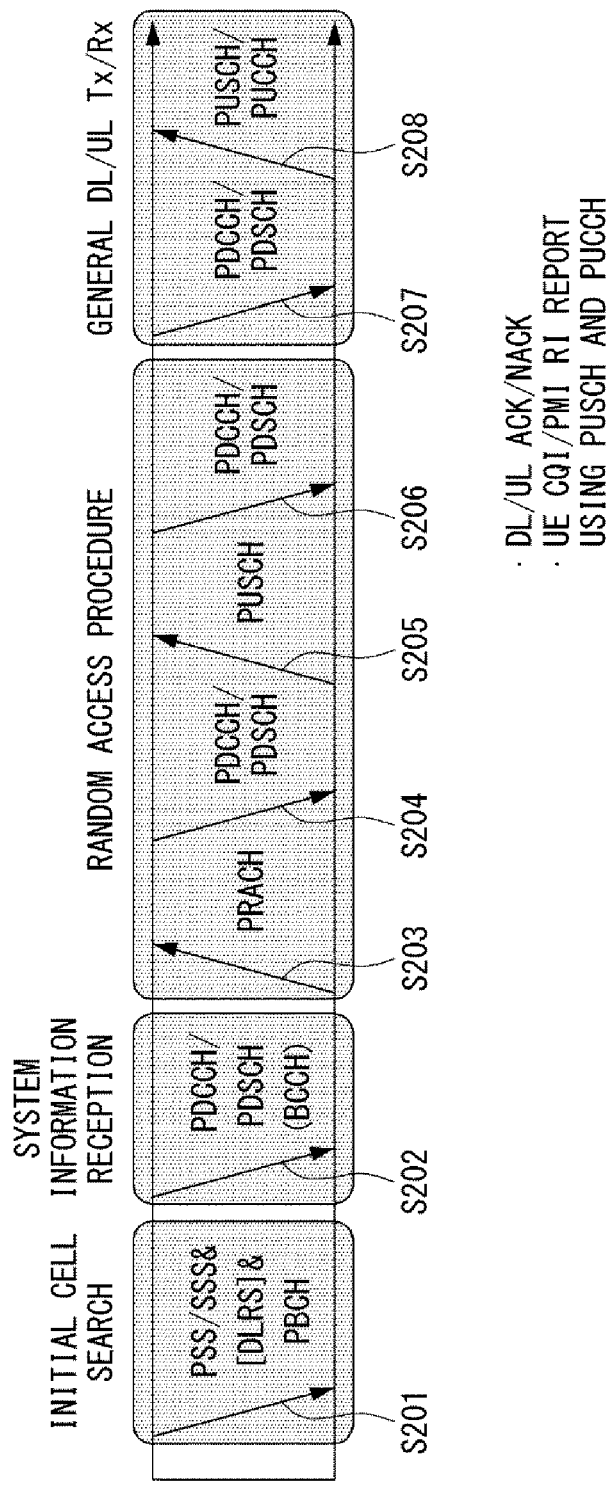
FIG. 2 shows an example of a signal transmission/reception method in the wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SIBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

ABM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Intelligent Refrigerators Using 5G Communication

Figure 3:
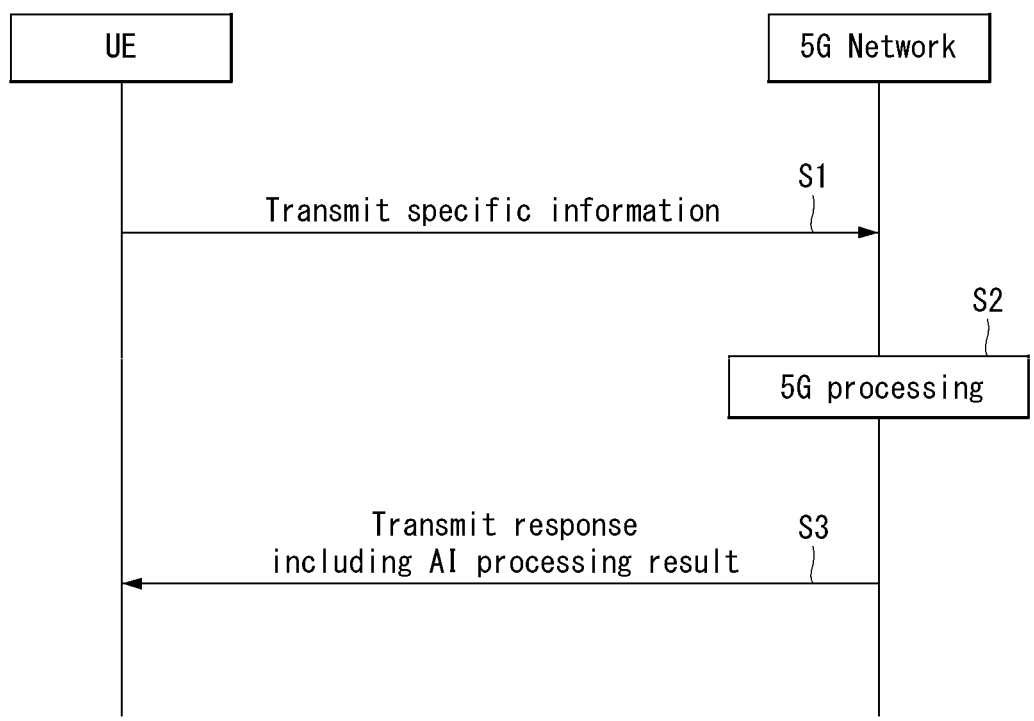
FIG. 3 shows an example of basic operations of a user terminal and a 5G network in a 5G communication system.

FIG. 3 shows an example of basic operations of an intelligent refrigerator and a 5G network in a 5G communication system.

The intelligent refrigerator transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the intelligent refrigerator (S3).

G. Applied Operations Between Intelligent Refrigerator and 5G Network in 5G Communication System Hereinafter, the operation of an intelligent refrigerator using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the intelligent refrigerator performs an initial access procedure and a random access procedure with the 5G network prior to step S1 of FIG. 3 in order to transmit/receive signals, information and the like to/from the 5G network.

More specifically, the intelligent refrigerator performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the intelligent refrigerator receives a signal from the 5G network.

In addition, the intelligent refrigerator performs a random access procedure with the 5G network for UL synchronization acquisition and/or UL transmission. The 5G network can transmit, to the intelligent refrigerator, a UL grant for scheduling transmission of specific information. Accordingly, the intelligent refrigerator transmits the specific information to the 5G network on the basis of the UL grant. In addition, the 5G network transmits, to the intelligent refrigerator, a DL grant for scheduling transmission of 5G processing results with respect to the specific information. Accordingly, the 5G network can transmit, to the intelligent refrigerator, information (or a signal) related to remote control on the basis of the DL grant.

Next, a basic procedure of an applied operation to which a method proposed by the present disclosure which will be described later and URLLC of 5G communication are applied will be described.

As described above, an intelligent refrigerator can receive DownlinkPreemption IE from the 5G network after the intelligent refrigerator performs an initial access procedure and/or a random access procedure with the 5G network. Then, the intelligent refrigerator receives DCI format 2_1 including a preemption indication from the 5G network on the basis of DownlinkPreemption IE. The intelligent refrigerator does not perform (or expect or assume) reception of eMBB data in resources (PRBs and/or OFDM symbols) indicated by the preemption indication. Thereafter, when the intelligent refrigerator needs to transmit specific information, the intelligent refrigerator can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the intelligent refrigerator receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the intelligent refrigerator transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

Figure 4:
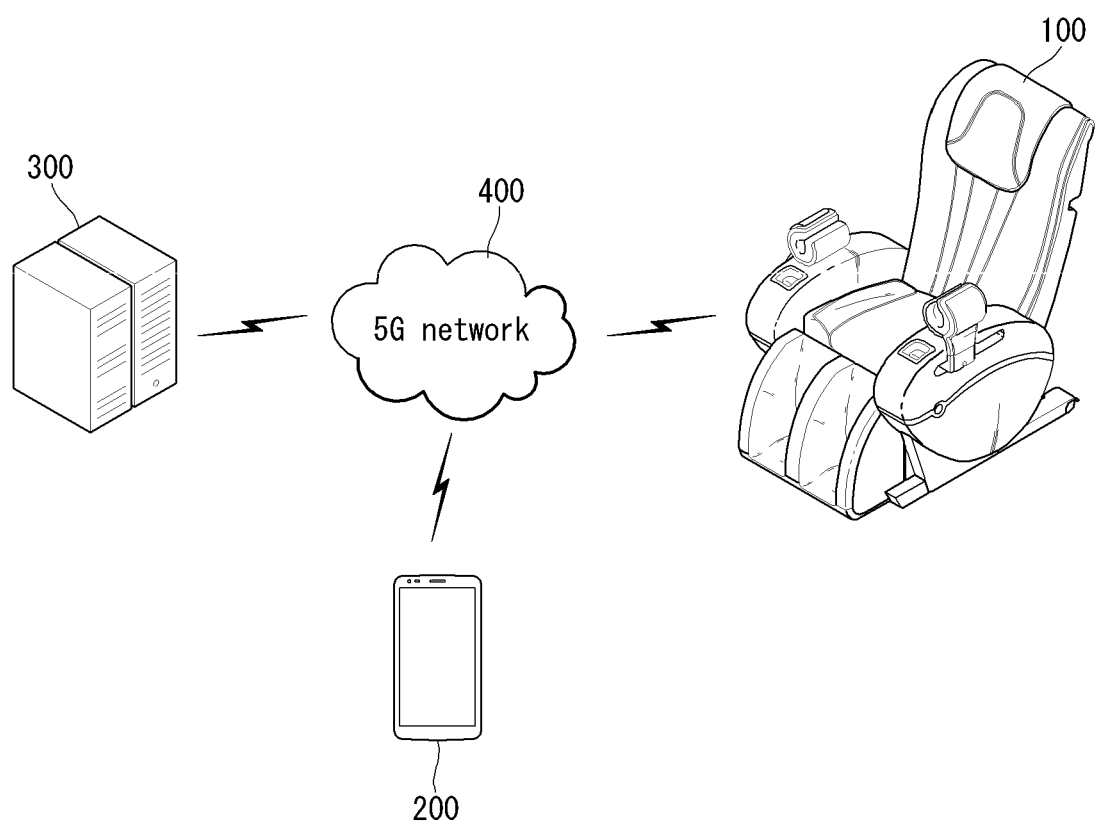
FIG. 4 is a diagram showing a controlled environment of a massage chair according to an embodiment of the present disclosure.

FIG. 4 is a diagram showing a controlled environment of a massage chair according to an embodiment of the present disclosure.

Referring to FIG. 4, the controlled environment of the massage chair may include a massage chair 100, a user terminal 200, a server 300, and a network 400.

The massage chair 100, the user terminal 200, and the server 300 may be connected to each other under a 5G communication environment. Furthermore, various electronic devices used at home or in offices as well as the devices shown in FIG. 4 may be connected to each other and operated under an IOT environment.

The massage chair 100 may tap, press, knead, pull or move the body of the user sitting on the chair depending on an operation mode to directly give mechanical stimulation to the body. The massage chair 100 may massage one or more of the head, back, arms, hips, and legs of the user sitting on the chair.

The massage chair 100 may acquire information about a user's body characteristics from a sensing unit 130 (see FIG. 6) mounted on the massage chair 100. However, without being limited thereto, the information about the body characteristics may be directly generated by the massage chair 100, or may be acquired from a smart terminal or an external device through the network 400.

The massage chair 100 may automatically determine an optimum driving mode for the massage chair 100 using the acquired information about the body characteristics. The operation mode determined by the massage chair 100 is an automatic massage course, which may include one or more of a rest course, a vitalization course, a late-night course, a stretching course, a relaxation course, a neck/shoulder course, a back/waist course and a leg/foot course, for example.

Figure 6:
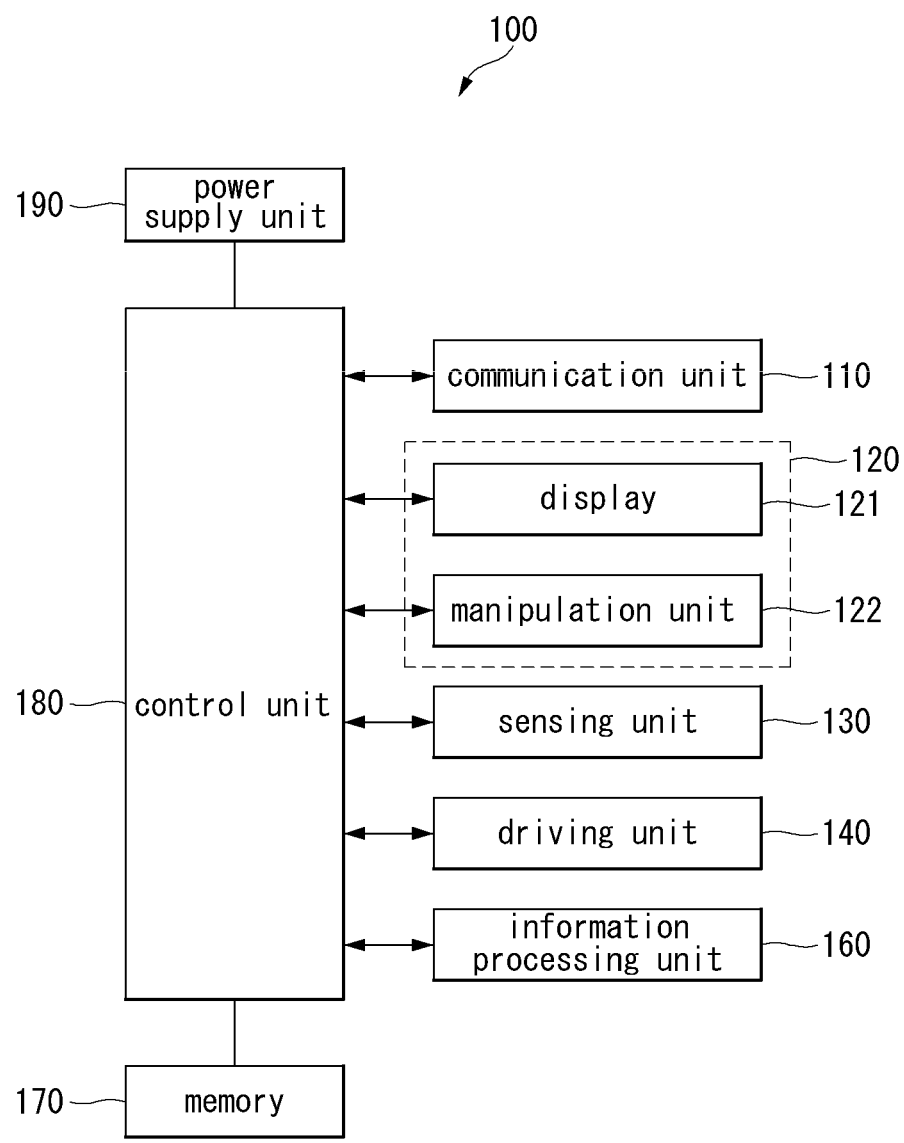
FIG. 6 is a schematic block diagram of the massage chair according to the embodiment of the present disclosure.

The massage chair 100 may extract a characteristic value from the information about the body characteristics acquired through the sensing unit 130 (see FIG. 6). The massage chair 100 may input the extracted characteristic value into a previously learned artificial neural network (ANN). The artificial neural network may be previously learned to create information that may determine the optimum operation mode for the user by receiving the characteristic value extracted from the information about the body characteristics and then outputting the value. The massage chair 100 may analyze the output value of the artificial neural network. The massage chair 100 may determine to set the optimum operation mode for the user, by using the analyzed output value of the artificial neural network.

The user terminal 200 may be provided with services that may transmit the information about the user's body characteristics to the massage chair 100 through an authentication process after accessing a massage-chair driving application or a massage-chair driving site, monitor status information of the massage chair 100, or drive or control the massage chair 100.

In the embodiment of the present disclosure, if the user terminal 200 receives a user's voice command after the authentication process, the terminal may operate the massage chair 100 by determining the operation mode of the massage chair 100 or may control the operation of the massage chair 100 by determining a massage position and/or massage strength and/or massage execution time and the like.

In the embodiment of the present disclosure, the user terminal 200 may include a desktop computer operated by a user, a smartphone, a notebook computer, a tablet PC, a smart TV, a mobile phone, a PDA (personal digital assistant), a laptop, a media player, a micro server, a GPS (global positioning system), an e-book terminal, a digital broadcasting terminal, navigation, a kiosk, an MP3 player, a digital camera, a home appliance and other mobile or non-mobile computing devices, but are not limited thereto.

Furthermore, the user terminal 200 may be a wearable terminal with a communication function and a data processing function, such as a watch, glasses, a hair band and a ring. The user terminal 200 is not limited to the above description, but a web-browsable terminal may be adopted without restriction.

The server 300 may be a database server that may provide big data required to apply various artificial intelligence algorithms and data required to operate the massage chair 100. In addition, the server 300 may include a web server or an application server to remote control the operation of the massage chair 100 using a massage-chair driving application or a massage-chair driving web browser installed in the user terminal 200.

Here, the artificial intelligence (AI) is a field of computer engineering and information technology to study a method of enabling a computer to execute thinking, learning, self-improvement and others that may be performed by human intelligence. In other words, the AI may mean that the computer mimics intelligent behaviors of the human.

Furthermore, the artificial intelligence does not exist by itself, but is directly or indirectly related to other fields of computer science. Particularly, recently, attempts are being very actively made to introduce artificial intelligent elements in various fields of the information technology and thereby solve problems of the associated fields.

Machine learning is a field of the artificial intelligence, and may include a field of study that gives the computer an ability to learn without an explicit program. In detail, the machine learning may be technology to study and build a system that learns based on empirical data, performs predictions, and improves its own performance, and an algorithm for the system. The algorithms of the machine learning may build a specific model to derive predictions or decisions based on input data, rather than to perform strictly fixed static program instructions.

The server 300 may transmit and receive the information about body characteristics to and from the massage chair 100 and/or the user terminal 200.

The server 300 may determine an optimum operation mode for the massage chair 100 using the acquired information about body characteristics, and then may transmit the determined optimum operation mode to the massage chair 100. The network 400 may serve to connect the massage chair 100, the user terminal 200, and the server 300 to each other. Such a network 400 may include a wired network, such as LANs (local area networks), WANs (wide area networks), MANs (metropolitan area networks), or ISDNs (integrated service digital networks), and a wireless network, such as wireless LANs, CDMA, bluetooth, or satellite communication, but the scope of the present disclosure is not limited thereto. Furthermore, the network 400 may transmit and receive information using local area communication and/or wide area communication. Here, the local area communication may include bluetooth, RFID (radio frequency identification), IrDA (infrared data association), UWB (ultra-wideband), ZigBee, and Wi-Fi (wireless fidelity) technologies, while the wide area communication may include CDMA (code division multiple access), FDMA (frequency division multiple access), TDMA (time division multiple access), OFDMA (orthogonal frequency division multiple access), and SC-FDMA (single carrier frequency division multiple access) technologies.

The network 400 may include a connection of network elements such as a hub, a bridge, a router, a switch and a gateway. The network 400 may include one or more connected networks including a public network such as Internet and a private network such as a secure enterprise private network, for instance, a multiple network environment. Access to the network 400 may be provided through one or more wired or wireless access networks. Moreover, the network 400 may support an IoT (Internet of Things) network that processes information sent to or received from distributed components such as things and/or 5G communication.

Figure 5:
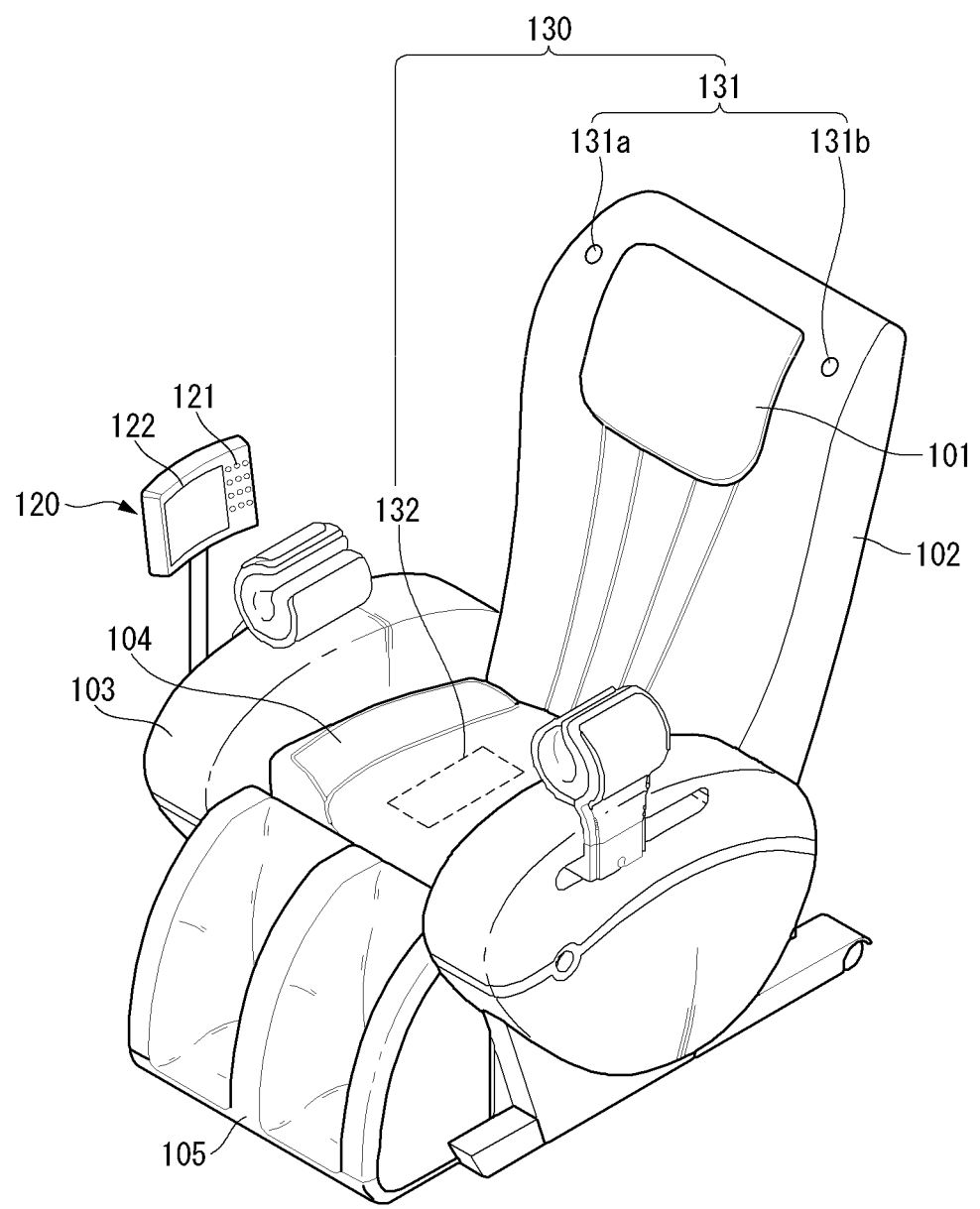
FIG. 5 is a front view of the massage chair according to the embodiment of the present disclosure.

FIG. 5 is a front view of the massage chair according to the embodiment of the present disclosure.

In the following description, the duplicated description of parts that have been described in FIG. 4 will be omitted.

Referring to FIG. 5, the massage chair 100 may be composed of an upper end, a seat part and a lower end depending on a position where the body is seated. That is, the chair includes the upper end that is formed to surround a user's head, the seat part that is formed to allow the user's upper body to be rested thereon, and the lower end that is formed to surround the calf and the foot, thus making a user feel comfortable. The position of each part of the massage chair 100 may be manually or automatically changed according to the user's body characteristics.

The massage chair 100 may include the sensing unit 130. The sensing unit 130 may include a first sensor 131 and a second sensor 132.

The upper end may include a head massage part 101 that supports the user's head and massages the head, and at least one first sensor 131. The first sensor 131 may be a camera.

At least one camera 106 may be disposed on the upper end or around the head massage part 101. For example, at least one camera 131 may include a first camera 131a and a second camera 131b. The first camera 131a may be disposed around a right side of the head massage part 101, while the second camera 131b may be disposed around a left side of the head massage part 101.

The camera 131 may photograph the user who desires to use the massage chair 100, and may collect first information about body characteristics through the photographed image. For example, the information about body characteristics may include a user's sex, height, a physique and the like.

Furthermore, since the first camera 131a and the second camera 131b are spaced apart from each other by a predetermined distance, it is possible to prevent a distortion phenomenon from occurring according to a distance between the user and the massage chair 100 when photographing the user, thus allowing accurate information about body characteristics to be collected or acquired.

The seat part may include a back massage part 102 that supports the user's back and massages the back, an arm massage part 103 that supports the user's arm and massages the arm, a hip massage part 104 that supports the user's hips and massages the hips, and the second sensor 132 that is disposed in the hip massage part 104.

The second sensor 132 may collect second information about body characteristics through the user sitting on the massage chair 100. The second information about body characteristics may include the user's weight.

The lower end may include a leg massage part 105 that supports the user's calf and foot and massages the calf and the foot.

The massage chair 100 may also include an user interface 120. In this regard, the user interface 120 may include a display 121 that displays information related to the massage under the control of a controller 180 (see FIG. 6), and a manipulation unit 122 that receives input from the user and transmits it to the controller 180.

As an alternative embodiment, the user interface 120 may be in the form of a touch screen made by integrating the display 121 and the manipulation unit 122.

FIG. 6 is a schematic block diagram of the massage chair according to the embodiment of the present disclosure.

In the following description, the duplicated description of parts that have been described in FIGS. 4 and 5 will be omitted.

Referring to FIG. 6, the massage chair 100 may include the communication unit 110, the user interface 120 including the display 121 and the manipulation unit 122, the sensor 130, a driving unit 140, an information processing unit 160, a memory 170 and the controller 180.

The communication unit 110 may provide a communication interface that is required to provide a signal transmitted and received between the massage chair 100, the user terminal 200 and/or the server 300 in the form of a packet data, in conjunction with the network 400. Furthermore, the communication unit 110 may support various machine-to-machine, such as IoT (Internet of things), IoE (Internet of everything), IoST (Internet of small things), etc. and may support M2M (machine to machine) communication, V2X (vehicle to everything communication) communication, D2D (device to device) communication, etc.

In the user interface 120, the display 121 may display the driving state of the massage chair 100 under the control of the controller 180. The display 121 may display the determined result of the operation mode depending on the determined result of the controller 180.

An example of the operation mode for displaying the determined result on the display 121 and/or the user terminal 200 is illustrated, which will be described later. According to an embodiment, the display 121 may be configured as a touch screen by forming a mutual layer structure with a touch pad. In this case, the display 121 may be used as the manipulation unit 122 that may input information by a user's touch. To this end, the display 121 may be configured as a touch recognition display controller or various input/output controllers. For example, the touch recognition display controller may provide an output interface and an input interface between the device and the user.

The touch recognition display controller may transmit and receive an electric signal to and from the controller 180. Furthermore, the touch recognition display controller may display a visual output to the user, and the visual output may include a text, a graphic, an image, a video, and a combination thereof. Such a display 121 may be, for example, a predetermined display member, such as an OLED (organic light emitting display) capable of recognizing a touch, or a LCD (liquid crystal display) or a LED (light emitting display).

The manipulation unit 122 of the user interface 120 may include a plurality of manipulation buttons (not shown) to transmit a signal corresponding to the input button to the controller 180. Such a manipulation unit 122 may be configured as a sensor, button or switch structure that may recognize a user's touch or push operation. In the embodiment of the present disclosure, the manipulation unit 122 may transmit a manipulation signal, which is manipulated by the user to confirm or change various information related to the driving of the massage chair 100 displayed on the display 121, to the controller 180.

The sensing unit 130 may acquire the information about body characteristics so as to acquire information about at least one of a body type, a posture and a position of the user sitting on the massage chair 100. The sensing unit 130 may include one or more sensors disposed on portions of the chair which are in contact with the user. Here, the sensors may include at least one of a camera, an electrostatic sensor, a pressure sensor and a piezoelectric sensor, and may acquire data on at least one of a contact surface and a contact intensity when the user is in contact with the massage chair 100. In this case, the controller 180 may acquire information about at least one of the user's body type, posture and position, based on the data acquired by the sensing unit 130.

Meanwhile, the sensor included in the sensing unit 130 is not limited to the above-described electrostatic sensor, pressure sensor and piezoelectric sensor, and may include any sensor that may collect data to acquire information about at least one of the user's body type, posture and position, for example, an ultrasonic sensor or an optical sensor.

In addition, the sensing unit 130 may acquire data to obtain information about the inclination of the massage chair 100. Here, the information about the inclination of the massage chair 100 may include at least one of the inclination information of the head massage part 101, the inclination information of the back massage part 102, the inclination information of the arm massage part 103, the inclination information of the hip massage part 104, the inclination information of the leg massage part 105, and the inclination information of the massage chair 100.

Furthermore, the sensing unit 130 may include one or more sensors that may measure the rotation of at least one of the head massage part 101, the back massage part 102, the arm massage part 103, the hip massage part 104 and the leg massage part 105. Furthermore, the entire massage chair 100 may rotate, and the sensing unit 130 may measure the rotation or inclination of the massage chair 100. To this end, one or more sensors included in the sensing unit 130 may be at least one of an inertial sensor, a magnetic sensor, a gravity sensor, a gyroscope sensor, and an acceleration sensor.

The driving unit 140 may generate a force to perform the massage, under the control of the controller 180. The driving unit 140 may transmit the generated force to one or more of the head massage part 101 that supports the user's head and massages the head, the back massage part 102 that supports the user's back and massages the back, the arm massage part 103 that supports the user's arm and massages the arm, the hip massage part 104 that supports the user's hips and massages the hips, and the leg massage part 105 that supports the user's calf and foot and massages the calf and the foot.

Furthermore, the driving unit 140 may generate and transmit a force to rotate one or more of the head massage part 101, the back massage part 102, the arm massage part 103, the hip massage part 104, and the leg massage part 105. To this end, the driving unit 140 may include one or more motors that generate the rotating force, and a power transmission unit that transmits the generated rotating force.

Furthermore, each of the head massage part 101, the back massage part 102, the arm massage part 103, the hip massage part 104 and the leg massage part 105 may include an airbag (not shown). The driving unit 140 may regulate the air pressure of the airbag of each of the head massage part 101, the back massage part 102, the arm massage part 103, the hip massage part 104 and the leg massage part 105 to perform the massage in various strengths.

The memory 170 is configured to store various information required to operate the massage chair 100, and may include a volatile or non-volatile recording medium. For example, the memory 170 may store a preset wakeup word to determine the presence or absence of the wakeup word from the user's uttered voice.

Furthermore, the memory 170 may store position information of a place where the massage chair 100 is provided, and position information of a place that is frequently used by the user, for example, a company.

Here, the memory 170 may include magnetic storage media or flash storage media, but the scope of the present disclosure is not limited thereto. Such a memory 170 may include an internal memory and/or an external memory, and may include a volatile memory such as DRAM, SRAM, or SDRAM, a non-volatile memory such as OTPROM (one time programmable ROM), PROM, EPROM, EEPROM, mask ROM, flash ROM, a NAND flash memory, or a NOR flash memory, a flash drive such as a SSD. CF (compact flash) card, a SD card, a Micro-SD card, a Mini-SD card, a Xd card, or a memory stick, or a storage such as HDD.

The controller 180 may control the entire operation of the massage chair 100 by driving control software mounted in the memory 170 as a kind of central processing unit. The controller 180 may control the massage position, the massage strength, and the massage execution time according to the driving mode (massage mode), and may control to massage at least one of the user's head, neck, left shoulder, right shoulder, back, waist, hips, left arm, right arm, left thigh, right thigh, left calf, and right calf, using the driving unit 140. However, without being limited thereto, there may also be a massage sit incorporating a plurality of above-described massage sites. For example, the plurality of massage sites may include at least one of the user's head, neck, shoulders, waist, hips, arms, and legs.

The controller 180 may include all kinds of data processing devices, such as a processor. In this connection, the term 'processor' may refer to a data processing device, which has a physically structured circuit to perform a function represented by codes or instructions included in a program, for example, and is embedded in hardware. As one example of the data processing device embedded in the hardware, a microprocessor, a central processing unit (CPU), a processor core, a multiprocessor, an ASIC (application-specific integrated circuit), a FPGA (field programmable gate array), etc. may be included, but the scope of the present disclosure is not limited thereto.

In the embodiment of the present disclosure, the controller 180 may perform machine learning, such as deep learning, to determine the optimum driving mode for the massage chair 100, and the memory 170 may store data used in the machine learning, result data, etc.

The deep learning technology that is a kind of the machine learning may learn to a deep level in multiple stages based on the data. The deep learning may represent a set of machine learning algorithms that extract core data from a plurality of data as the stage increases. The deep learning structure may include an artificial neural network (ANN). For example, the deep learning structure may be composed of a deep neural network (DNN), such as a CNN (convolutional neural network), a RNN (recurrent neural network), and a DBN (deep belief network). The deep learning structure according to the embodiment of the present disclosure may use various known structures. For example, the deep learning structure according to the present disclosure may include the CNN, the RNN, the DBN, etc. The RNN is widely used to process a natural language, has a structure which is effective to process time-series data that changes over time, and can form an artificial neural network by stacking layers every moment. The DBN may include a deep learning structure formed by stacking RBMs (restricted boltzman machines) in multiple layers, which is a deep learning technique. If a predetermined number of layers are stacked by repeating the RBM learning, the DBN having the associated number of layers may be formed. The CNN may include a model that simulates the function of the human brain based on the assumption that the basic features of an object are extracted, complex calculations are performed in the brain, and the object is recognized based on the calculated result, when a person recognizes the object.

Meanwhile, the learning of the artificial neural network may be performed by adjusting a weight (bias value if necessary) of a connection line between nodes to achieve desired output for given input. Furthermore, the artificial neural network may continuously update the weight value by the learning. Furthermore, a method such as back propagation may be used for the learning of the artificial neural network.

Meanwhile, the controller 180 may be equipped with the artificial neural network, and may recognize a user and a user's tone based on the machine learning using the received voice input signal as input data.

The controller 180 may include the artificial neural network, for example, the deep neural network (DNN) such as CNN, RNN, or DBN, and may learn the deep neural network. As the machine learning method of the artificial neural network, both unsupervised learning and supervised learning may be used.

A power supply unit 190 may supply power to the massage chair 100. The power supply unit 190 may be supplied with power and then supply the power to each unit of the massage chair 100.

Figure 7:
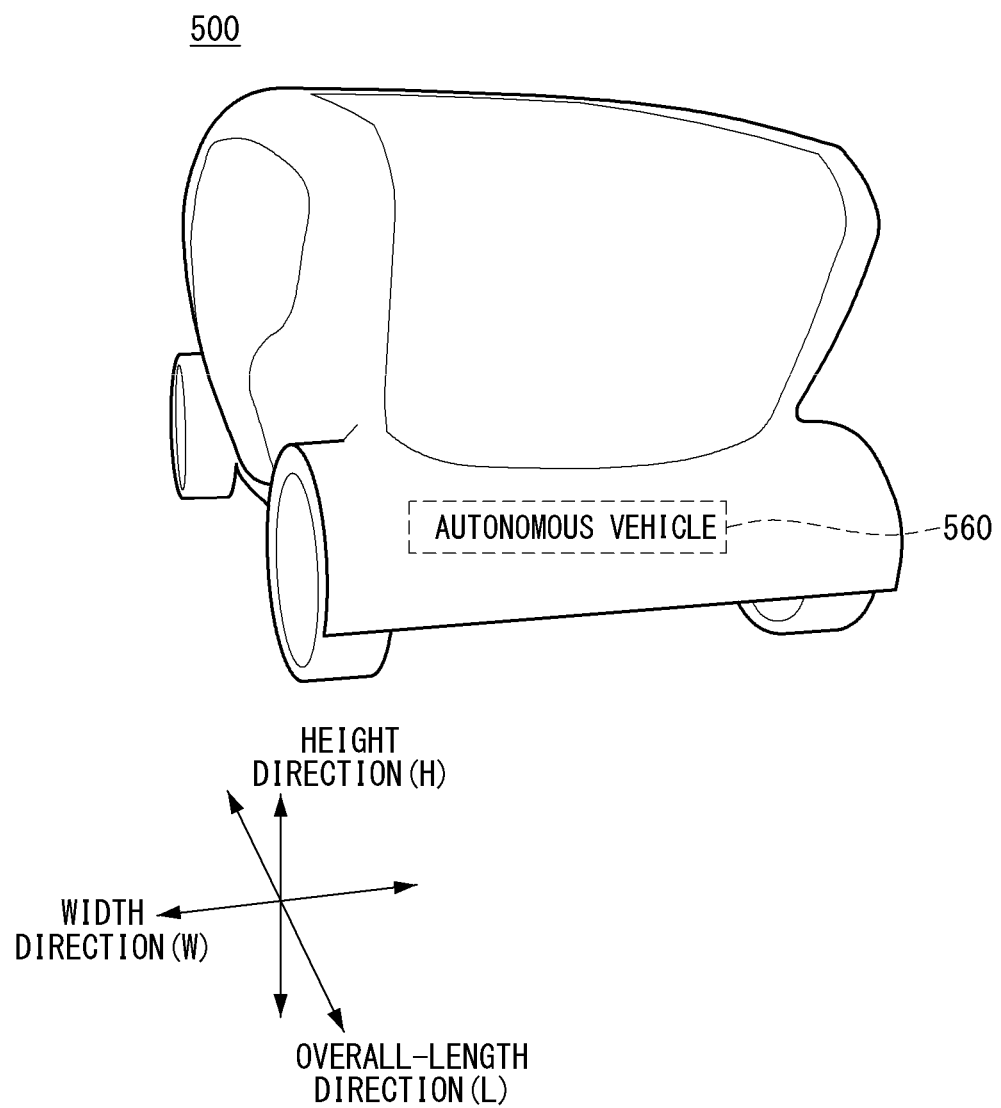
FIG. 7 is a diagram showing a vehicle according to an embodiment of the present disclosure.

FIG. 7 is a diagram showing a vehicle according to an embodiment of the present disclosure.

Referring to FIG. 7, a vehicle 500 according to an embodiment of the present disclosure is defined as a transportation means traveling on roads or railroads. The vehicle 500 includes a car, a train and a motorcycle. The vehicle 500 may include an internal-combustion engine vehicle having an engine as a power source, a hybrid vehicle having an engine and a motor as a power source, and an electric vehicle having an electric motor as a power source. The vehicle 500 may be a private own vehicle. The vehicle 500 may be a shared vehicle. The vehicle 500 may be an autonomous vehicle.

Figure 8:
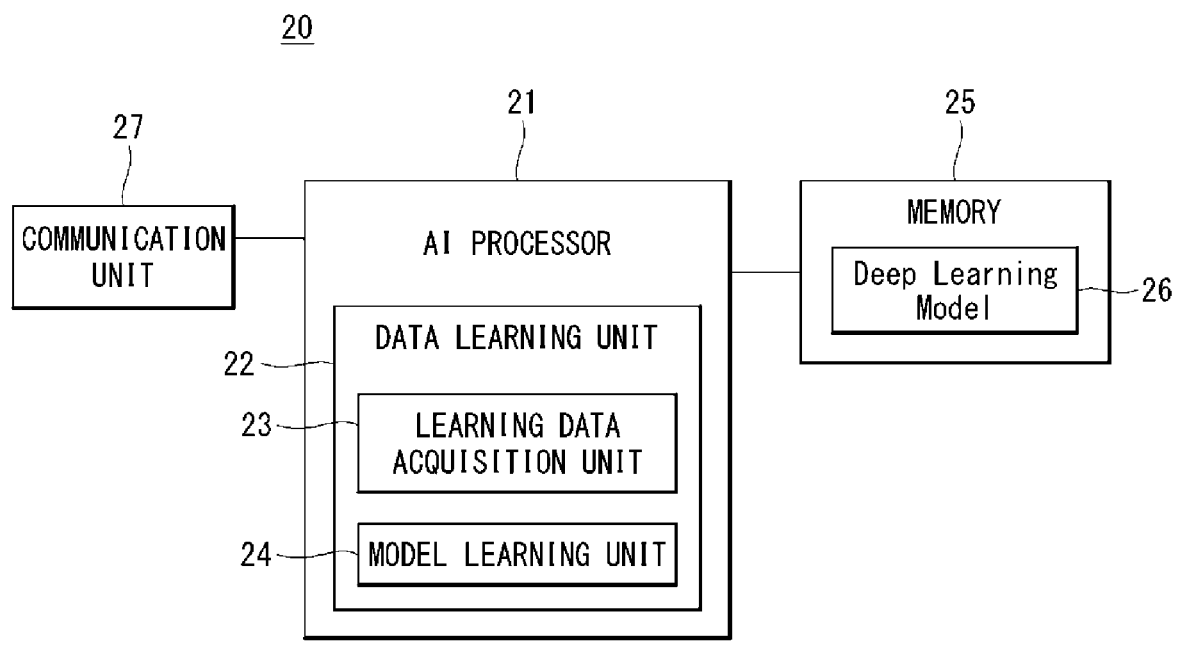
FIG. 8 is a block diagram of an AI device according to an embodiment of the present disclosure.

FIG. 8 is a block diagram of an AI device according to an embodiment of the present disclosure.

An AI device 20 may include an electronic device including an AI module that can perform AI processing, a server including the AI module, or the like. Further, the AI device 20 may be included as at least one component of the vehicle 500 shown in FIG. 7 to perform together at least a portion of the AI processing.

The AI processing may include all operations related to driving of the vehicle 500 shown in FIG. 7. For example, an autonomous vehicle can perform operations of processing/determining, and control signal generating by performing AI processing on sensing data or driver data. Further, for example, an autonomous vehicle can perform autonomous driving control by performing AI processing on data acquired through interaction with other electronic devices included in the vehicle.

The AI device 20 may include an AI processor 21, a memory 25, and/or a communication unit 27.

The AI device 20, which is a computing device that can learn a neural network, may be implemented as various electronic devices such as a server, a desktop PC, a notebook PC, and a tablet PC.

The AI processor 21 can learn a neural network using programs stored in the memory 25. In particular, the AI processor 21 can learn a neural network for recognizing data related to vehicles. Here, the neural network for recognizing data related to vehicles may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present disclosure.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, vehicle data and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 5 was functionally separately described into the AI processor 21, the memory 25, the communication unit 27, etc., but it should be noted that the aforementioned components may be integrated in one module and referred to as an AI module.

Figure 9:
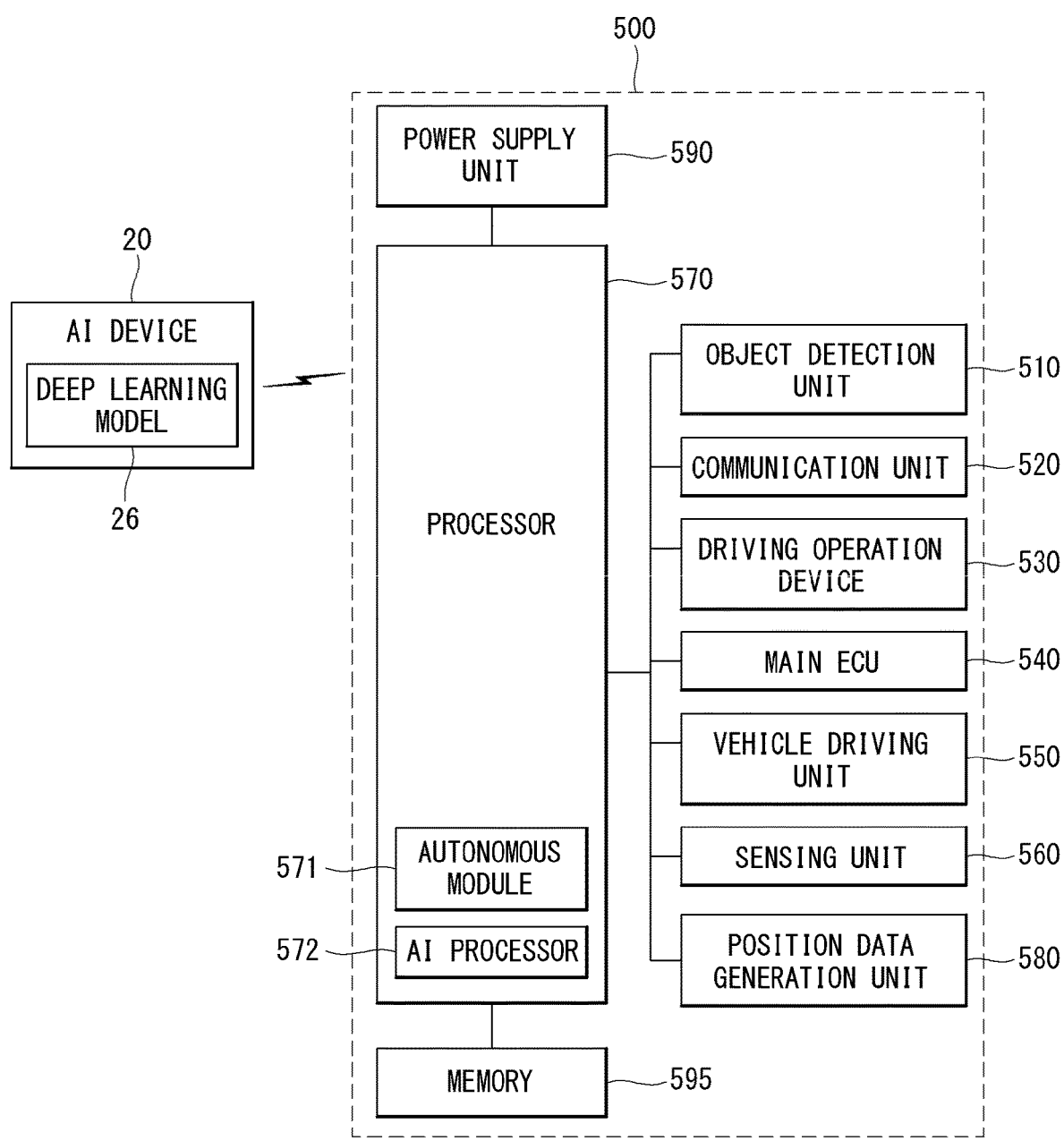
FIG. 9 is a diagram illustrating a system associating an autonomous vehicle with the AI device according to an embodiment of the present disclosure.

FIG. 9 is a diagram for illustrating a system in which an autonomous vehicle and an AI device according to an embodiment of the present disclosure are linked.

Referring to FIG. 9, an autonomous vehicle 500 can transmit data that require AI processing to an AI device 20 through a communication unit and the AI device 20 including a neural network model 26 can transmit an AI processing result using the neural network model 26 to the autonomous vehicle 500. The description of FIG. 8 can be referred to for the AI device 20.

The autonomous vehicle 500 may include a memory 595, a processor 570, and a power supply 590 and the processor 570 may further include an autonomous module 571 and an AI processor 572. Further, the autonomous vehicle 500 may include an interface that is connected with at least one electronic device included in the vehicle in a wired or wireless manner and can exchange data for autonomous driving control. At least one electronic device connected through the interface may include an object detection unit 510, a communication unit 520, a driving operation unit 530, a main ECU 540, a vehicle driving unit 550, a sensing unit 560, and a position data generation unit 580.

The interface can be configured using at least one of a communication module, a terminal, a pin, a cable, a port, a circuit, an element, and a device.

The memory 595 is electrically connected with the processor 570. The memory 595 can store basic data about units, control data for operation control of units, and input/output data. The memory 595 can store data processed in the processor 570. Hardware-wise, the memory 595 may be configured using at least one of a ROM, a RAM, an EPROM, a flash drive and a hard drive. The memory 595 can store various types of data for the overall operation of the autonomous vehicle 500, such as a program for processing or control of the processor 570. The memory 595 may be integrated with the processor 570. Depending on embodiments, the memory 595 may be classified as a lower configuration of the processor 570.

The power supply 190 can supply power to the autonomous vehicle 500. The power supply 190 can be provided with power from a power source (e.g., a battery) included in the autonomous vehicle 500 and can supply the power to each unit of the autonomous vehicle 500. The power supply 190 can operate according to a control signal supplied from the main ECU 540. The power supply 190 may include a switched-mode power supply (SMPS).

The processor 570 can be electrically connected to the memory 595, the interface 180, and the power supply 190 and exchange signals with these components. The processor 570 can be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 570 can be operated by power supplied from the power supply 190. The processor 570 can receive data, process the data, generate a signal, and provide the signal while power is supplied thereto by the power supply 190.

The processor 570 can receive information from other electronic devices included in the autonomous vehicle 500 through the interface. The processor 570 can provide control signals to other electronic devices in the autonomous vehicle 500 through the interface.

The autonomous device 10 may include at least one printed circuit board (PCB). The memory 595, the interface, the power supply 190, and the processor 570 may be electrically connected to the PCB.

Hereafter, other electronic devices connected with the interface and included in the vehicle, the AI processor 572, and the autonomous module 571 will be described in more detail. Hereafter, for the convenience of description, the autonomous vehicle 500 is referred to as a vehicle 500.

First, the object detection unit 510 can generate information on objects outside the vehicle 500. The AI processor 572 can generate at least one of on presence or absence of an object, positional information of the object, information on a distance between the vehicle and the object, and information on a relative speed of the vehicle with respect to the object by applying data acquired through the object detection unit 510 to a neural network model.

The object detection unit 510 may include at least one sensor that can detect objects outside the vehicle 500. The sensor may include at least one of a camera, a radar, a lidar, an ultrasonic sensor, and an infrared sensor. The object detection unit 510 can provide data about an object generated on the basis of a sensing signal generated from a sensor to at least one electronic device included in the vehicle.

Meanwhile, the vehicle 500 transmits the sensing data acquired through at least one sensor to the AI device 20 through the communication unit 520 and the AI device 20 can transmit AI processing data by applying the neural network model 26 to the transmitted data to the vehicle 500. The vehicle 500 recognizes information about the detected object on the basis of the received AI processing data and the autonomous module 571 can perform an autonomous driving control operation using the recognized information.

The communication unit 520 can exchange signals with devices disposed outside the vehicle 500. The communication unit 520 can exchange signals with at least any one of an infrastructure (e.g., a server and a broadcast station), another vehicle, and a terminal. The communication unit 520 may include at least any one of a transmission antenna, a reception antenna, a radio frequency (RF) circuit which can implement various communication protocols, and an RF element in order to perform communication.

It is possible to generate at least one of on presence or absence of an object, positional information of the object, information on a distance between the vehicle and the object, and information on a relative speed of the vehicle with respect to the object by applying data acquired through the object detection unit 510 to a neural network model.

The driving operation unit 530 is a device for receiving user input for driving. In a manual mode, the vehicle 500 may be driven on the basis of a signal provided by the driving operation unit 530. The driving operation unit 530 may include a steering input device (e.g., a steering wheel), an acceleration input device (e.g., an accelerator pedal), and a brake input device (e.g., a brake pedal).

Meanwhile, the AI processor 572, in an autonomous mode, can generate an input signal of the driving operation unit 530 in accordance with a signal for controlling movement of the vehicle according to a driving plan generated through the autonomous module 571.

Meanwhile, the vehicle 500 transmits data for control of the driving operation unit 530 to the AI device 20 through the communication unit 520 and the AI device 20 can transmit AI processing data generated by applying the neural network model 26 to the transmitted data to the vehicle 500. The vehicle 500 can use the input signal of the driving operation unit 530 to control movement of the vehicle on the basis of the received AI processing data.

The main ECU 540 can control the overall operation of at least one electronic device included in the vehicle 500.

The vehicle driving unit 550 is a device for electrically controlling various vehicle driving devices included in the vehicle 500. The vehicle driving unit 550 may include a power train driving control device, a chassis driving control device, a door/window driving control device, a safety device driving control device, a lamp driving control device, and an air-conditioner driving control device. The power train driving control device may include a power source driving control device and a transmission driving control device. The chassis driving control device may include a steering driving control device, a brake driving control device, and a suspension driving control device. Meanwhile, the safety device driving control device may include a seatbelt driving control device for seatbelt control.

The vehicle driving unit 550 includes at least one electronic control device (e.g., a control ECU (Electronic Controller)).

The vehicle driving unit 550 can control a power train, a steering device, and a brake device on the basis of signals received by the autonomous module 571. The signals received by the autonomous module 571 may be driving control signals that are generated by applying a neural network model to data related to the vehicle in the AI processor 572. The driving control signals may be signals received from the external AI device 20 through the communication unit 520.

The sensing unit 560 can sense a state of the vehicle. The sensing unit 560 may include at least any one of an internal measurement unit (IMU) sensor, a collision sensor, a wheel sensor, a speed sensor, an inclination sensor, a weight sensor, a heading sensor, a position module, a vehicle forward/backward movement sensor, a battery sensor, a fuel sensor, a tire sensor, a steering sensor, a temperature sensor, a humidity sensor, an ultrasonic sensor, an illumination sensor, and a pedal position sensor. Further, the IMU sensor may include one or more of an acceleration sensor, a gyro sensor, and a magnetic sensor.

The AI processor 572 can generate state data of the vehicle by applying a neural network model to sensing data generated by at least one sensor. The AI processing data generated by applying the neural network model may include vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data of a pressure applied to an accelerator pedal, data of a pressure applied to a brake pedal, etc.

The autonomous module 571 can generate a driving control signal on the basis of the AI-processed state data of the vehicle.

Meanwhile, the vehicle 500 transmits the sensing data acquired through at least one sensor to the AI device 20 through the communication unit 22 and the AI device 20 can transmit AI processing data generated by applying the neural network model 26 to the transmitted data to the vehicle 500.

The position data generation unit 580 can generate position data of the vehicle 500. The position data generation unit 580 may include at least any one of a global positioning system (GPS) and a differential global positioning system (DGPS).

The AI processor 572 can generate more accurate position data of the vehicle by applying a neural network model to position data generated by at least one position data generation device.

In accordance with an embodiment, the AI processor 572 can perform deep learning calculation on the basis of at least any one of the internal measurement unit (IMU) of the sensing unit 560 and the camera image of the object detection unit 510 and can correct position data on the basis of the generated AI processing data.

Meanwhile, the vehicle 500 transmits the position data acquired from the position data generation unit 580 to the AI device 20 through the communication unit 520 and the AI device 20 can transmit the AI processing data generated by applying the neural network model 26 to the received position data to the vehicle 500.

The vehicle 500 may include an internal communication system 50. The plurality of electronic devices included in the vehicle 500 can exchange signals through the internal communication system 50. The signals may include data. The internal communication system 50 can use at least one communication protocol (e.g., CAN, LIN, FlexRay, MOST or Ethernet).

The autonomous module 571 can generate a route for autonomous driving and a driving plan for driving along the generated route on the basis of the acquired data.

The autonomous module 571 can implement at least one ADAS (Advanced Driver Assistance System) function. The ADAS can implement at least one of ACC (Adaptive Cruise Control), AEB (Autonomous Emergency Braking), FCW (Forward Collision Warning), LKA (Lane Keeping Assist), LCA (Lane Change Assist), TFA (Target Following Assist), BSD (Blind Spot Detection), HBA (High Beam Assist), APS (Auto Parking System), a PD collision warning system, TSR (Traffic Sign Recognition), TSA (Traffic Sign Assist), NV (Night Vision), DSM (Driver Status Monitoring), and TJA (Traffic Jam Assist).

The AI processor 572 can transmit control signals that can perform at least one of the ADAS functions described above to the autonomous module 571 by applying traffic-related information received from at least one sensor included in the vehicle and external devices and information received from another vehicle communicating with the vehicle to a neural network model.

Further, the vehicle 500 transmits at least one data for performing the ADAS functions to the AI device 20 through the communication unit 520 and the AI device 20 can transmit the control signal that can perform the ADAS functions to the vehicle 500 by applying the neural network model 260 to the received data.

The autonomous module 571 can acquire state information of a driver and/or state information of a vehicle through the AI processor 572 and can perform switching from an autonomous mode to a manual driving mode or switching from the manual driving mode to the autonomous mode.

Meanwhile, the vehicle 500 can use AI processing data for passenger support for driving control. For example, as described above, it is possible to check the states of a driver and passengers through at least one sensor included in the vehicle.

Alternatively, the vehicle 500 can recognize voice signals of a driver or passengers, perform a voice processing operation, and perform a voice synthesis operation through the AI processor 572.

5G communication for implementing the vehicle control method according to an embodiment of the present disclosure and schematic contents for performing AI processing by applying the 5G communication and for transmitting/receiving the AI processing result were described above.

Hereafter, a detailed method of passively intervening or actively intervening in a careless state of a driver on the basis of state information of the driver in accordance with an embodiment of the present disclosure is described with reference to necessary drawings.

Figure 10:
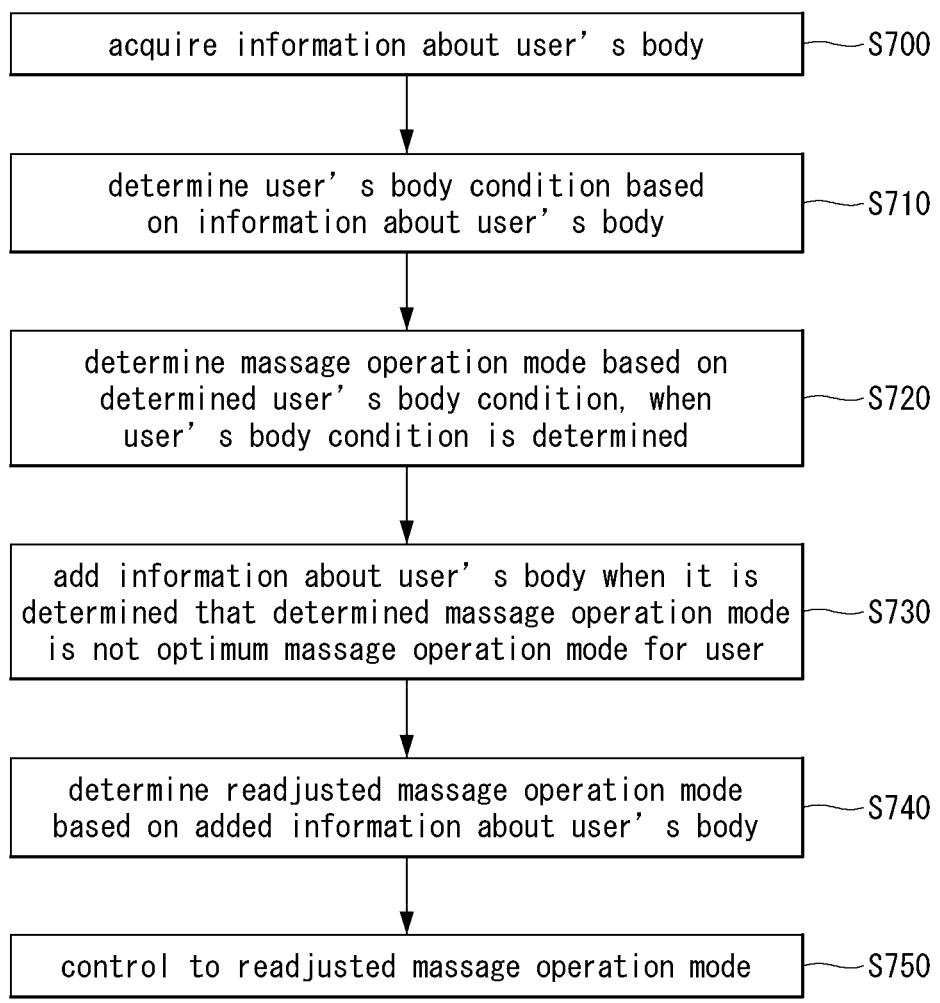
FIG. 10 is a flowchart of a control method of an intelligent chair according to an embodiment of the present disclosure.

FIG. 10 is a flowchart of a control method of an intelligent chair according to an embodiment of the present disclosure.

The control method of the intelligent chair according to the embodiment of the present disclosure may be implemented in the massage chair or a vehicle including the function described with reference to FIGS. 1 to 9.

The processor (180 of FIG. 6 or 570 of FIG. 9) may acquire information about the user's body at step S700. FIG. 10 will be described with reference to the processor 570 shown in FIG. 9.

The processor 570 may acquire the information about the user's body through at least one sensor provided on the intelligent chair.

The at least one sensor may be at least one camera provided in the massage chair 100. For example, the camera may be disposed around the head massage part of the massage chair. The processor 570 may analyze an image acquired from the camera and then use the image to determine the information about the user's body, such as the user's height, the user's physique, or the user's sex.

Furthermore, the at least one sensor may include at least one weight sensor. The information about the user's body may include the user's weight measured through the weight sensor.

The processor 570 may determine the condition of the user's body based on the information about the user's body at step S710.

The detailed process of determining the user's body condition will be described below with reference to FIG. 11. As described above, the user's body condition may be determined based on the information about the user's body in the massage chair 100 or the vehicle 500 itself or in the 5G network.

When the user's body condition is determined, the processor 570 may determine a massage operation mode on the basis of the determined user's body condition at step S720.

When it is determined that the determined massage operation mode is not the optimum massage operation mode for the user, the processor 570 may add the information about the user's body at step S730. The processor 570 may add the information about the user's body through the information about the user's body that is previously stored in the memory, the user terminal, the server or the like.

The processor 570 may determine a massage operation mode that is readjusted based on the added information about the user's body at step S740. The display may add the information about the user's body under the control of the processor 570, and may readjust the massage operation mode based on the added information about the user's body at step S750. For example, the user may control a screen with his or her finger as he or she enlarges a photograph through the display, thus finely controlling a shoulder height and a width between rollers, and storing and learning data.

Figure 11:
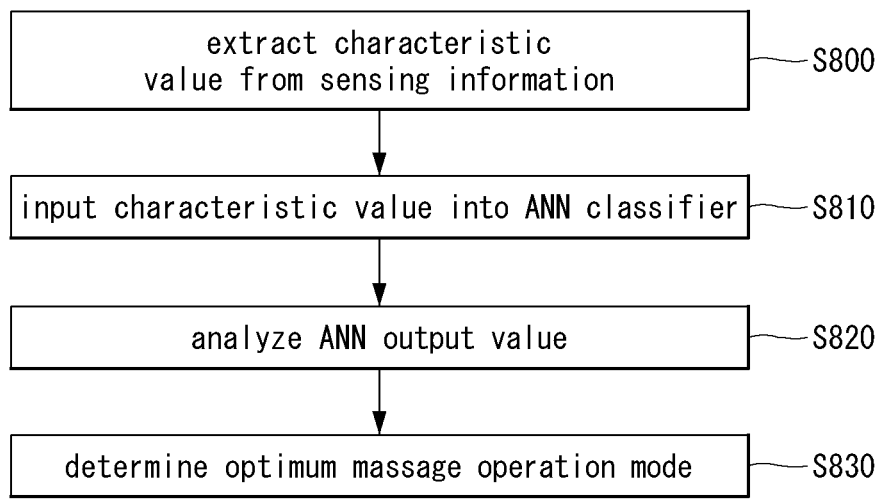
FIG. 11 is a diagram illustrating an example of determining a user's body condition in an embodiment of the present disclosure.

FIG. 11 is a diagram illustrating an example of determining a user's body condition in an embodiment of the present disclosure.

Referring to FIG. 11, the processor 570 may extract characteristic values from sensing information acquired through at least one sensor to determine the user's body condition at step S800.

For example, the processor 570 may receive the information about the user's body, such as the user's height or the user's weight, from at least one sensor (e.g. camera or weight sensor). The processor 570 may extract the characteristic value from the user's height or the user's weight.

The processor 570 may control to input the characteristic values into a trained artificial neural network (ANN) classifier to distinguish whether the mode is the optimum massage operation mode for the user at step S810.

The processor 570 may be combined with the extracted characteristic value to generate body detection input. The body detection input may be input into the trained artificial neural network (ANN) classifier to distinguish whether the mode is the optimum massage operation mode for the user, based on the extracted characteristic value.

The processor 570 may analyze the output value of the artificial neural network at step S820, and may determine the user's body condition based on the output value of the artificial neural network at step S830.

The processor 570 may identify from the output of the artificial neural network classifier whether the mode is the optimum massage operation mode for the user.

Although FIG. 11 illustrates an example where an operation of identifying the user's body condition through the AI processing is realized in the processing of the massage chair or the vehicle 500, the present disclosure is not limited thereto. For example, the AI processing may be performed on the 5G network based on the sensing information received from the massage chair or the vehicle 500.

Figure 12:
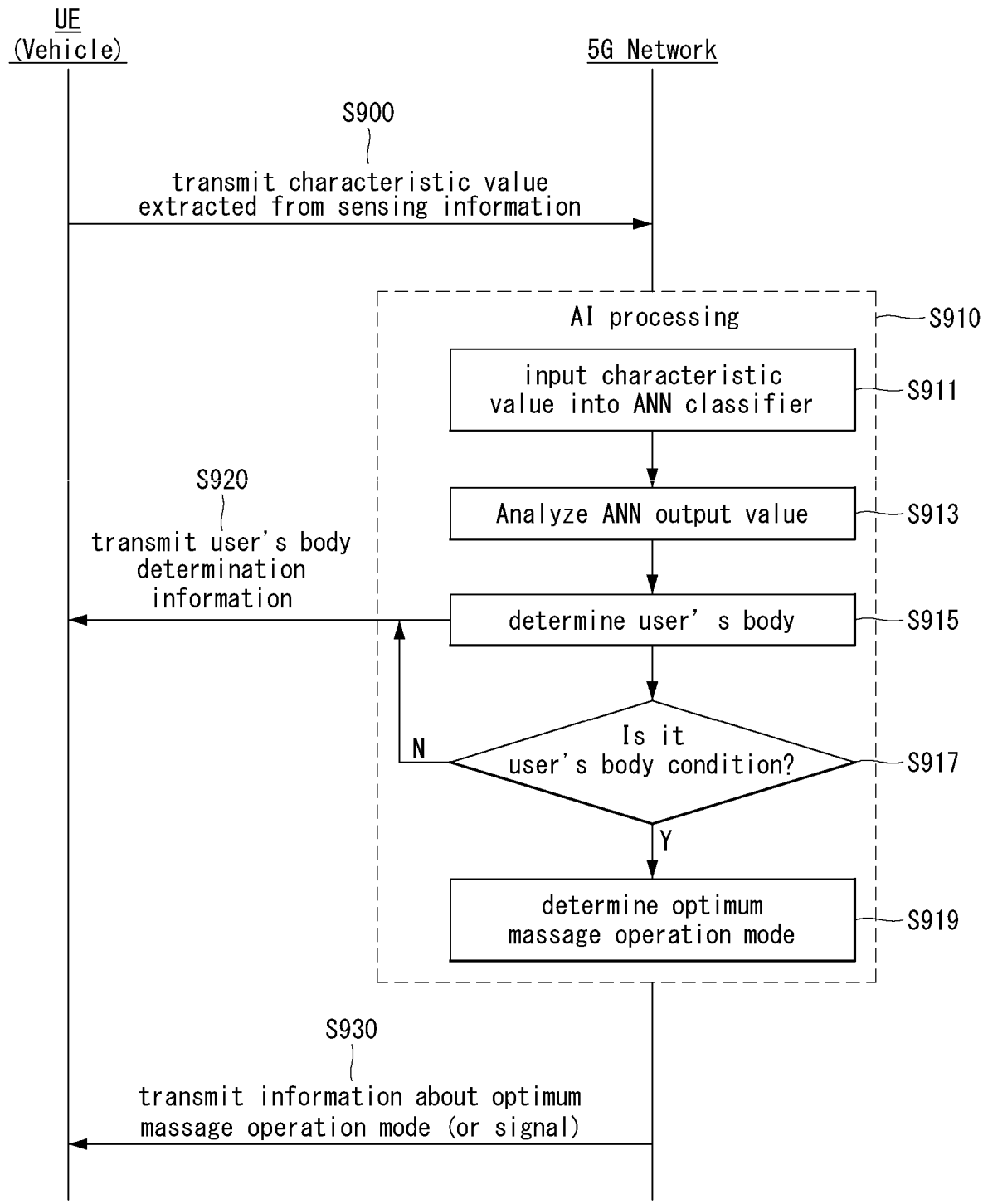
FIG. 12 is a diagram illustrating another example of determining a user's body condition in the embodiment of the present disclosure.

FIG. 12 is a diagram illustrating another example of determining a user's body condition in the embodiment of the present disclosure.

The processor 570 may control the communication unit to transmit the information about the user's body to the AI processor included in the 5G network. Furthermore, the processor 570 may control the communication unit to receive the AI processed information from the AI processor.

The AI processed information may be information for determining whether the mode is the optimum massage operation mode for the user or is not the optimum massage operation mode for the user.

Meanwhile, the massage chair or the vehicle 500 may perform an initial access procedure with the 5G network to transmit the information about the user's body to the 5G network. The massage chair or the vehicle 500 may perform the initial access procedure with the 5G network based on the SSB (synchronization signal block).

Furthermore, the massage chair or the vehicle 500 may receive, from the network, Downlink Control Information (DCI) used to schedule the transmission of the information about the user's body acquired from at least one sensor provided in the massage chair or the vehicle.

The processor 570 may transmit the information about the user's body to the network based on the DCI.

The information about the user's body may be transmitted through a PUSCH to the network, and the SSB and a DM-RS of the PUSCH is quasi-co located for a QCL type D.

Referring to FIG. 12, the massage chair or the vehicle 500 may transmit the characteristic value extracted from the sensing information to the 5G network at step S900.

Here, the 5G network may include the AI processor or the AI system, and the AI system of the 5G network may perform the AI processing based on the received sensing information at step S910.

The AI system may input the characteristic values received from the vehicle 500 into the ANN classifier at step S911. The AI system may analyze the ANN output value at step S913, and may determine the user's body from the ANN output value at step S915. The 5G network may transmit the information about the user's body determined by the AI system through the wireless communication unit to the massage chair or the vehicle 500.

When it is determined that the transmitted information is the user's body condition at step 917, the AI system may change the massage chair operated in the massage operation mode into the optimum massage operation mode.

Meanwhile, the massage chair or the vehicle 500 may transmit only the sensing information to the 5G network, and may extract the characteristic value corresponding to the body detection input that is to be used as the input of the artificial neural network for determining the user's body condition from the sensing information in the AI system included in the 5G network.

According to an embodiment of the present disclosure, when the massage chair confirms the user's body condition, the chair may transmit a message related to the user's body condition through the V2X communication to the vehicle. The V2X terminal installed in the massage chair may exchange various messages through the V2X communication with a peripheral V2X base station, a V2X terminal installed in the vehicle, the V2X terminal of a driver or user or the like. Likewise, the handheld V2X terminal of the driver or user may exchange various messages through the V2X communication with the peripheral V2X base station, the V2X terminal installed in the massage chair or vehicle or the like. According to an embodiment of the present disclosure, when the massage chair confirms the user's body condition, the chair may transmit a message related to the user's body condition through the V2X communication to the vehicle.

The present disclosure described above may be implemented using a computer-readable medium with programs recorded thereon for execution by a processor to perform various methods presented herein. The computer-readable medium includes all kinds of recording devices capable of storing data that is readable by a computer system. Examples of the computer-readable mediums include hard disk drive (HDD), solid state disk (SSD), silicon disk drive (SDD), ROM, RAM, CD-ROM, a magnetic tape, a floppy disk, an optical data storage device, the other types of storage mediums presented herein, and combinations thereof. If desired, the computer-readable medium may be realized in the form of a carrier wave (e.g., transmission over Internet). Thus, the foregoing description is merely an example and is not to be considered as limiting the present disclosure. The scope of the present disclosure should be determined by rational interpretation of the appended claims, and all changes within the equivalent range of the present disclosure are included in the scope of the present disclosure.

What is claimed is:

1. A method of controlling a chair, comprising:
acquiring information about a user's body;
determining a user's body condition based on the acquired information;
determining a massage operation mode based on the determined user's body condition;
adding, based on the determined massage operation mode being a non-optimal massage operation mode for the user, the acquired information about the user's body to a previously stored set of information;
determining an adjusted massage operation mode based on the acquired information added to the previously stored set of information;
controlling the chair to perform in the adjusted massage operation mode;
performing an initial access procedure with at least one network based on a synchronization signal block (SSB);
receiving, from the at least one network, Downlink Control Information (DCI) used to schedule transmission, by the chair, of the information about the user's body; and
transmitting the information about the user's body to the at least one network based on the DCI,
wherein the information about the user's body is transmitted through a physical uplink shared channel (PUSCH) to the at least one network, and
wherein the SSB and a DM-RS of the PUSCH are quasi-co located for a QCL type D.

2. The method of claim 1, wherein the determining of the user's body condition comprises:
extracting characteristic values from information acquired through at least one sensor disposed in the chair;
inputting the characteristic values into a trained artificial neural network (ANN) classifier; and
determining the user's body condition based on output values of the artificial neural network,
wherein the output values of the artificial neural network are used to distinguish whether the determined massage operation mode is an optimum massage operation mode for the user.

3. The method of claim 2, further comprising:
controlling a communication unit of the chair to transmit the information about the user's body to an artificial intelligence (AI) processor in the at least one network; and
controlling the communication unit to receive processed information from the AI processor,
wherein the AI processor determines whether the determined massage operation mode is the optimum massage operation mode for the user.

4. The method of claim 3, further comprising:
transmitting, by the communication unit of the chair, a vehicle to everything communication (V2X) message that includes the information about the user's body condition to other terminals that are linked to the chair through the communication unit of the chair.

5. The method of claim 1, wherein the chair is configured to mount to a driver's seat or a passenger's seat in a vehicle.

6. The method of claim 1, wherein acquiring information about the user's body comprises acquiring information about at least one of a body type of the user, a posture of the user, or a position of the user sitting on the chair.

7. The method of claim 2, wherein the at least one sensor comprises at least one of a camera, an electrostatic sensor, a pressure sensor, or a piezoelectric sensor.

8. The method of claim 2, wherein acquiring information about the user's body further comprises:
based on a contact intensity being larger than a threshold value when the user contacts the chair, acquiring data, by the at least one sensor, from at least one contact surface.

9. A chair comprising:
at least one sensor disposed on the chair and configured to acquire information about a user's body;
a communication unit; and
a controller that receives the acquired information about the user's body,
wherein the controller is configured to:
determine a user's body condition based on the acquired information about the user's body;
determine a massage operation mode based on the determined user's body condition;
add, based on the determined massage operation mode being a non-optimal massage operation mode for the user, the information about the user's body to a previously stored set of information;
determine an adjusted massage operation mode based on the acquired information added to the previously stored set of information;
control the chair to perform the adjusted massage operation mode;
perform an initial access procedure with at least one network based on a synchronization signal block (SSB);
receive, from the at least one network, Downlink Control Information (DCI) used to schedule transmission, by the chair, of the information about the user's body; and
transmit the information about the user's body to the at least one network based on the DCI,
wherein the information about the user's body is transmitted through a physical uplink shared channel (PUSCH) to the at least one network, and
wherein the SSB and a DM-RS of the PUSCH are quasi-co located for a QCL type D.

10. The chair of claim 9, wherein the controller is further configured to:
extract characteristic values from information acquired through at least one sensor disposed in the chair;
input the characteristic values into a trained artificial neural network (ANN) classifier; and
determine the user's body condition based on output values of the artificial neural network.

11. The chair of claim 10, wherein the output values of the artificial neural network are used to distinguish whether the determined massage operation mode is an optimum massage operation mode for the user.

12. The chair of claim 11,
wherein the controller controls the communication unit to transmit the information about the user's body condition to an artificial intelligence (AI) processor in at least one network, and controls the communication unit to receive processed information from the AI processor, and
wherein the AI processor determines whether the determined massage operation mode is the optimum massage operation mode for the user.

13. The chair of claim 9, wherein the chair is configured to mount to a driver's seat or a passenger seat in a vehicle.

14. The chair of claim 12, wherein the communication unit of the chair transmits a vehicle to everything communication (V2X) message that includes the information about the user's body condition to other terminals that are linked to the chair through the communication unit of the chair.

15. The chair of claim 10, wherein the at least one sensor is further configured to acquire information about the user's body by acquiring information about at least one of a body type of the user, a posture of the user, or a position of the user sitting on the chair.

16. The chair of claim 10, wherein the at least one sensor comprises at least one of a camera, an electrostatic sensor, a pressure sensor, or a piezoelectric sensor.

17. The chair of claim 10, wherein the controller is further configured to:
based on a contact intensity being larger than a threshold value when the user contacts the chair, acquire data, by the at least one sensor, from at least one contact surface.

* * * * *

UNITED STATES PATENT AND TRADEMARK OFFICE
CERTIFICATE OF CORRECTION

| | | |
|---|---|---|
| PATENT NO. | : 11,623,553 B2 | Page 1 of 1 |
| APPLICATION NO. | : 16/692675 | |
| DATED | : April 11, 2023 | |
| INVENTOR(S) | : Jinhwa Jeon | |

It is certified that error appears in the above-identified patent and that said Letters Patent is hereby corrected as shown below:

On the Title Page

After item (65) Prior Publication Data, insert the following:
--(30) Foreign Application Priority Data
Sep. 2, 2019 (KR) .................................................. 10-2019-0108436--.

Signed and Sealed this
Twenty-third Day of January, 2024

Katherine Kelly Vidal
*Director of the United States Patent and Trademark Office*